(12) United States Patent
Hendrix et al.

(10) Patent No.: US 12,387,279 B1
(45) Date of Patent: Aug. 12, 2025

(54) SYSTEMS AND METHODS FOR AUTOMATED DATA COMPLIANCE MANAGEMENT

(71) Applicant: The ONSI Group, Inc., San Antonio, TX (US)

(72) Inventors: Angela Renee Hendrix, San Antonio, TX (US); Joshua David Hinckley, San Antonio, TX (US); Oscar Enrique Tello, Jr., San Antonio, TX (US)

(73) Assignee: The ONSI Group, Inc., San Antonio, TX (US)

( * ) Notice: Subject to any disclaimer, the term of this patent is extended or adjusted under 35 U.S.C. 154(b) by 0 days.

(21) Appl. No.: 18/916,499

(22) Filed: Oct. 15, 2024

(51) Int. Cl.
*G06Q 40/12* (2023.01)
*G06Q 10/10* (2023.01)

(52) U.S. Cl.
CPC ........... *G06Q 40/125* (2013.12); *G06Q 10/10* (2013.01)

(58) Field of Classification Search
CPC .............................. G06Q 40/125; G06Q 10/10
See application file for complete search history.

(56) References Cited

U.S. PATENT DOCUMENTS

| | | | | |
|---|---|---|---|---|
| 2002/0184148 | A1* | 12/2002 | Kahn ..................... | G06Q 40/02 705/40 |
| 2006/0235731 | A1* | 10/2006 | Gupta ..................... | G06Q 10/10 705/4 |
| 2013/0339061 | A1* | 12/2013 | Edwards ............ | G06Q 10/1057 705/4 |
| 2014/0279610 | A1* | 9/2014 | Hendrix ............... | G06Q 30/018 705/317 |
| 2015/0348215 | A1* | 12/2015 | Doll ...................... | G06Q 30/018 705/32 |
| 2022/0414791 | A1* | 12/2022 | Askew ................. | G06Q 40/125 |

OTHER PUBLICATIONS

Erana-Diaz et al., "Optimization for Risk Decision-Making Through Simulated Annealing", Jun. 25, 2020, IEEE Access, vol. 8, pp. 117063-117079 (Year: 2020).*

* cited by examiner

*Primary Examiner* — Fahd A Obeid
*Assistant Examiner* — Jessica E Sullivan
(74) *Attorney, Agent, or Firm* — Outlier Patent Attorneys, PLLC

(57) ABSTRACT

The proposed invention takes available data from existing sources and pulls out the threads that are important for government or union contracting compliance. Additionally, the system formats the data such that it is standardized and actionable. For example, payroll data, fringe benefit plan(s) data, contractual data, and employee census data can be viewed in a way that separates and highlights important aspects of each data set. The invention may also utilize artificial intelligence (AI) to error check and discover missing or mislabeled data. The system standardizes the data such that compliance monitoring and analysis may be done in near real time. In addition, the invention allows for enhanced management of detected payment overages.

22 Claims, 7 Drawing Sheets

SYSTEMS AND METHODS FOR AUTOMATED DATA COMPLIANCE MANAGEMENT

CROSS-REFERENCE TO RELATED APPLICATIONS

None.

BACKGROUND

Field of Art

The present invention relates to employee payroll and fringe benefit management and compliance. More specifically, the present invention relates to managing payroll and fringe benefits within government or union contracts.

Background

There are lots of systems for employee/payroll processes to make sure that employees in a government or union contracting situation get paid. For example, payroll data computes hours worked or salaried wages. Insurance systems compute coverage amounts and employee/employer contribution data. But, there are no systems that take a holistic view of employee compensation with a particular view on government or union contracting and associated compliance regimes. That is because existing systems only capture a portion of the data necessary for this type of holistic understanding. Even if appropriate data was captured by the existing systems, such data would be unusable because it is not specific enough (i.e. does not include applicable fringe benefits requirements, annualization requirements, hour bank reserve(s), travel time, or per diem, etc.) to be usable for government or union contracting compliance. Currently, there simply isn't a way to identify if a government or union contractor is compliant without expensive and time consuming audits.

Current methods on how this data associated with compliance is displayed are difficult for users to interpret and make it difficult to identify any overages and shortfalls. Current solutions rely on extensive auditing hours resulting in hundreds of hours to conduct the audit and prohibitively exorbitant costs. Some solutions provided may utilize standardized forms to import and analyze data, but may lack customization for wide ranging requirements within various states, counties, and cities.

Current systems that take into account government or union contracts operate across a wide range of states and localities each of which have different requirements and laws for compliance. Current solutions may take into account federal regulations and filter out data important for state or local laws. Currently there are no solutions available to differentiate filtering based upon local, state, and federal laws and regulations.

In addition, while additional hours and costs can be absorbed by some larger companies and smaller companies may work within a standardized solution, the management of both data and funds needs to be handled in a way that is beneficial for both. Current solutions may provide financial investment solutions managed by the current insurance providers creating a potential conflict of interest and poor returns on investment. Current solutions may also fail to properly document changes to the system, or be inefficient in monitoring changes.

SUMMARY

The proposed invention takes available data from existing sources and pulls out the threads that are important for government or union contracting compliance. Additionally, the system formats the data such that it is standardized and actionable. For example, payroll data, fringe benefit plan(s) data, contractual data, and employee census data can be viewed in a way that separates and highlights important aspects of each data set. The invention may also utilize artificial intelligence (AI) to error check and discover missing or mislabeled data. The system standardizes the data such that compliance monitoring and analysis may be done in near real time. In addition, the invention allows for enhanced management of detected payment overages.

The current invention utilizes a standardized importing method to organize and detect deficiencies within the imported data. In addition, the data imported can comprise time & attendance, payroll, fringe benefit plan(s) (i.e., insurance, retirement, hour bank reserve, paid time off, etc.), contractual, and employee census data. Once imported, the data is organized and important data is highlighted and compared to expected and historical data sets to ensure that the information is ready for any potential audits or reviews. This process differs from current methods of importing into large spreadsheets which make accessing data difficult and lacks the ability to easily check against imported data and various federal, state, and local laws.

The current invention provides flagging of information within the inputted or obtained data to show compliance with both federal and state laws. The invention provides alerts within sets of rules found in these sets of laws and within an associated contract. These flags are added based upon a decision tree which helps improve efficiency over other systems used today. A user may then be prompted to respond to the deficiency. Additionally, the current invention is capable of switching between external and internal analysis and auditing, a feature that is not found in current solutions.

Overages and shortfalls within the data sets are detected across singular, multiple employees or company wide. In addition, the analysis can be performed across a wide range of time periods. These calculations can then assist an employer in making payment decisions and any compliance issues may be highlighted for the user. This display provides an improvement to the current day displays which do not highlight these deficiencies in an easily understandable and accessible manner. This greatly improves the ability for a user to identify shortfalls or overages earlier in a pay cycle, which may be weekly, bi-weekly, semi-monthly, monthly, quarterly or yearly.

The present invention represents an advancement in the field of data compliance management. By leveraging artificial intelligence (AI) and natural language processing (NLP) techniques, the invention addresses the limitations of existing systems, which often rely on manual intervention and lack the ability to process unstructured data effectively.

The invention's AI component employs machine learning algorithms, such as decision trees or neural networks, to identify patterns and anomalies in the data, facilitating error detection and data validation. This approach enables the system to analyze vast amounts of data quickly and accurately, reducing the need for manual review and intervention. The AI model is trained using supervised learning techniques on a corpus of labeled data, including historical payroll and benefits data, as well as relevant local, state, and federal regulations. By continuously updating and refining the AI model based on new data and user feedback, the invention ensures its accuracy and adaptability to changing regulations and contract requirements.

Furthermore, the invention incorporates advanced data mapping algorithms to transform extracted data into a standardized format, enabling efficient compliance monitoring and analysis. This standardization process allows for real-time compliance assessment, proactively identifying potential non-compliance issues and alerting users to take corrective actions before they escalate into legal or financial consequences.

Unlike conventional compliance management solutions, which often rely on reactive, post-hoc audits, the present invention enables proactive management of compliance risks. By continuously monitoring data against relevant regulations and contract requirements, the system can automatically detect and flag potential compliance issues in real-time. This real-time detection allows for immediate remediation, such as generating alerts for users to review and address the identified issues promptly.

Moreover, the invention's data filtering and preprocessing techniques, such as feature selection and dimensionality reduction, optimize the data for analysis and reduce computational overhead. This optimization results in faster processing times compared to conventional methods, enabling the system to handle large volumes of data efficiently.

The automated nature of the invention's compliance monitoring and error-checking capabilities significantly reduces the need for manual intervention, minimizing human errors and saving substantial time and resources compared to traditional auditing processes. By leveraging AI and NLP techniques, the invention can identify potential compliance issues that might be missed by human auditors, enhancing the overall accuracy and reliability of the compliance assessment.

As such, the present invention represents a significant advancement in the field of data compliance management. By automating data standardization, enabling real-time compliance monitoring, and leveraging AI and NLP techniques for accurate and efficient analysis, the invention addresses the limitations of existing systems and provides a proactive approach to compliance management. The systems and methods disclosed herein enhance the overall efficiency and effectiveness of data compliance management processes, ultimately reducing the risk of legal and financial consequences associated with non-compliance.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION OF EMBODIMENTS

Figure 1:
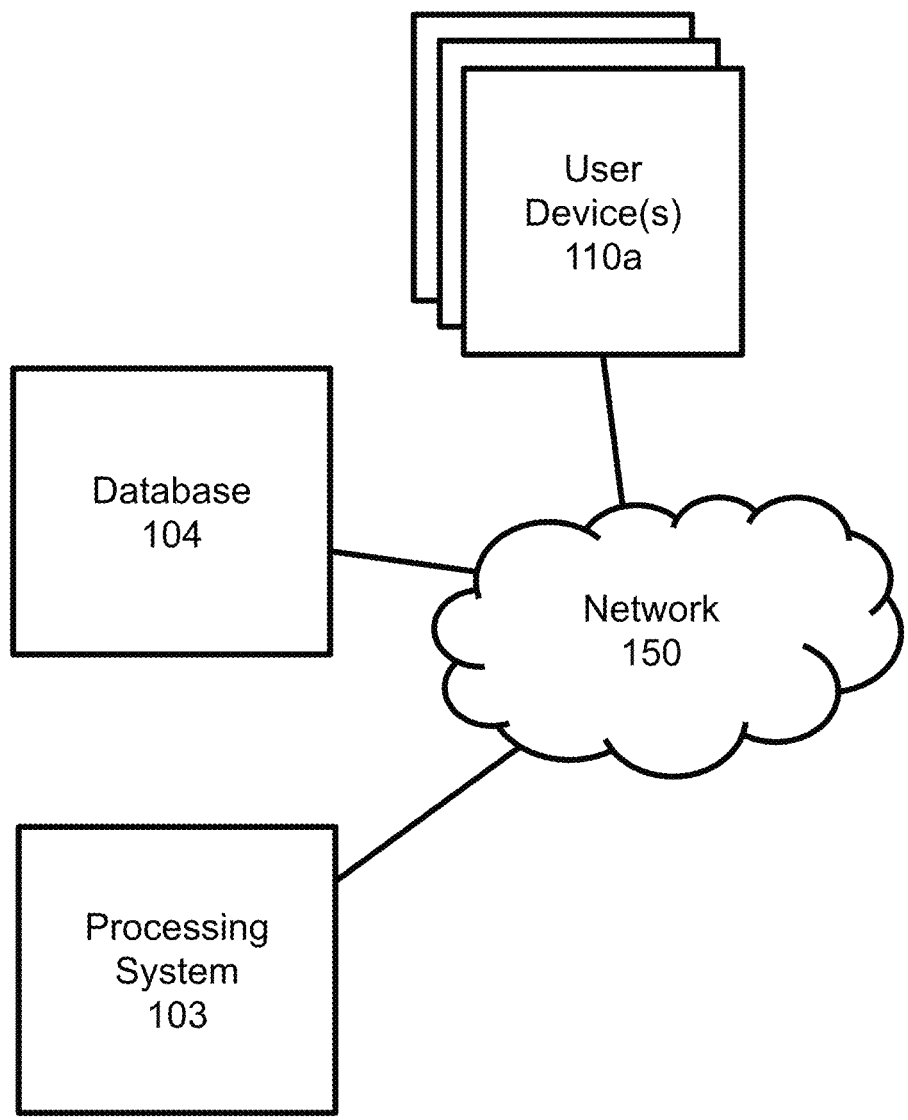
FIG. 1 illustrates a system diagram for an exemplary embodiment of a payroll or fringe benefit management system.

The proposed invention takes available data from existing sources and pulls out the threads that are important for government or union contracting compliance. Additionally, the system formats the data such that it is standardized and actionable. For example, payroll data, fringe benefit plan data, contractual data, and employee census data can be viewed in a way that separates and highlights important aspects of each data set. The invention may also utilize artificial intelligence (AI) to error check and discover missing or mislabeled data. The system standardizes the data such that compliance monitoring and analysis may be done in near real time. In addition, the invention allows for enhanced management of detected payment overages.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates a system for standardizing, analyzing, and reporting on employer/employee contractual relationships. The system comprises a processing system 103, a database 104, a plurality of user devices 110, and an electronic network 150 connecting all three.

The processing system 103 may comprise a computing environment capable of executing steps that provide the standardization, analysis, and reporting on employer/employee contractual relationships. In an embodiment of the invention, the processing system may comprise a microprocessor or computing environment. The processing system is operable to obtain at least one of payroll data, fringe benefit plan data, contractual data, and employee census data in multiple formats and through various methods. The processing system may also filter and make calculations to the obtained data to observe compliance to auditing and reporting requirements and provide alerts to a user. The processing system may also provide AI analysis of the imported data compared against expected information and other legal and compliance requirements.

The database 104 may comprise a data storage location or device capable of containing large amounts of labeled and organized data. The database 104 may be easily searchable and auditable. The information contained within the database 104 may be editable by the processing system 103 and connected to the other system components through a network 150. In an alternative embodiment of the invention, the database 104 may be contained on the user device 110.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include encryption systems and encrypted databases Other databases and systems may be added or subtracted, as would be readily understood by a person of ordinary skill in the art, without departing from the scope of the invention.

Figure 2:
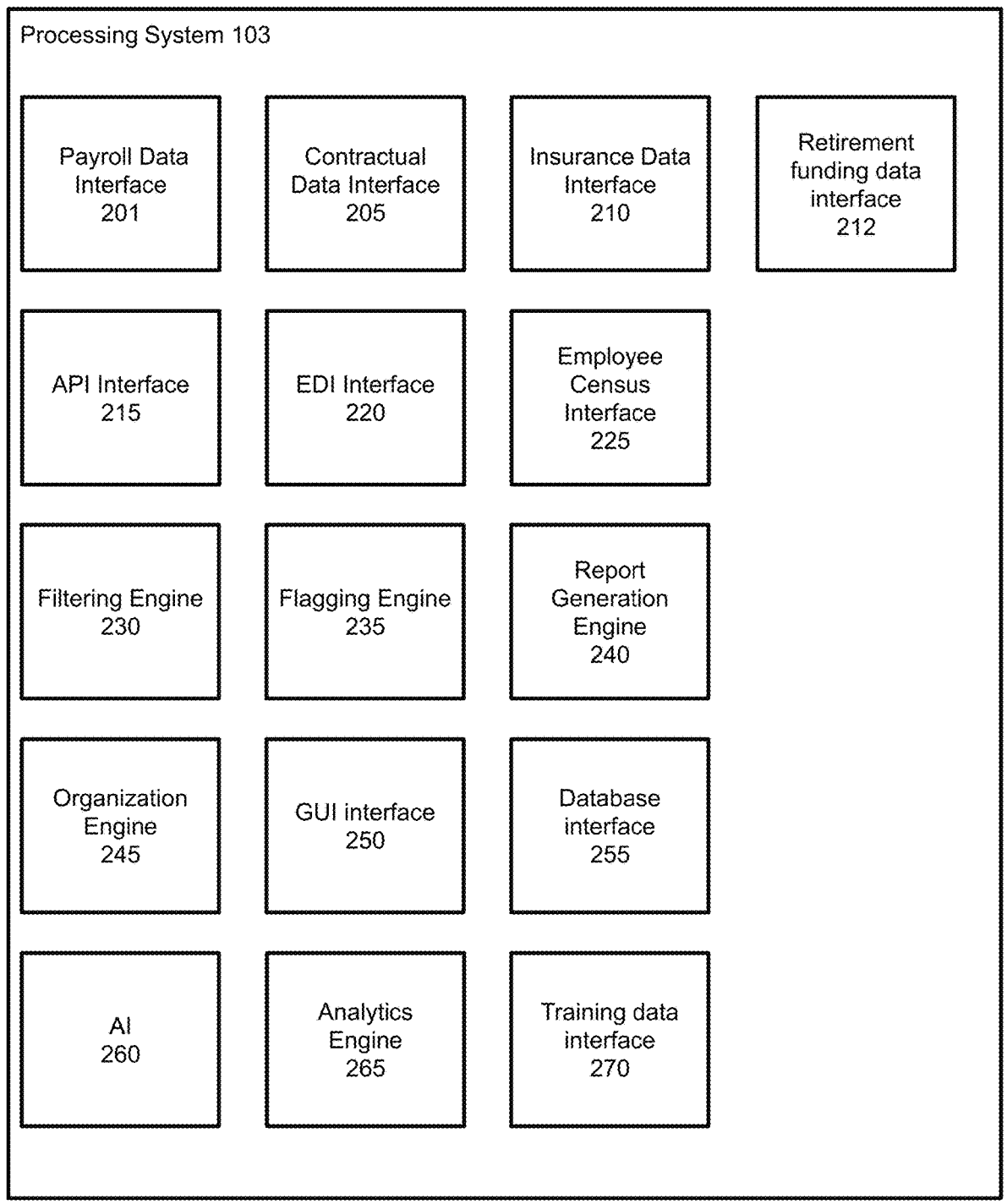
FIG. 2 illustrates a processing system diagram for an exemplary embodiment of a payroll or fringe benefit management system.

FIG. 2 illustrates an example computing environment in accordance with an exemplary embodiment of the present invention. The computing environment and processor 103 may comprise a payroll data interface 201, a contractual data interface 205, a fringe benefit data interface 210, retirement funding data interface 212, an API interface 215, an EDI interface 220, an employee census interface 225, a filtering engine 230, a flagging engine 235, a report generation engine 240, an organization engine 245, a display interface 250, a database interface 255, an AI engine 260, an analytics engine 265, and a training data interface 270.

The payroll data interface 201 may comprise an interface for obtaining payroll data from an outside source. The outside source may be the employer and/or a third party company. The payroll data may be imported through at least one of a payroll platform plug-in, an application programming interface (API), electronic data interchange (EDI), file import, and raw data import. The payroll data may comprise at least one of regular hours worked, standard or time and a half or double or triple overtime hours worked, second shift hours worked, third shift hours worked, hazard hours worked, paid time off hours (i.e., vacation, holiday, sick leave, bereavement, funeral, jury duty, military training, maternity/paternity leave, voting, etc.), training hours, travel hours, sleep hours, on-call hours, callback hours, federal or state or local tax deductions, FICA deductions, Social Security deductions, medicare deductions, company-sponsored benefit plan deductions, dependent coverages, retirement plan contributions and/or deductions, union dues, apprenticeship costs, pay rates, overtime rates, and differential rates. The paid time data may be comprised of at least one differential pay rate for each paid time category. The employee fringe benefits payment data may comprise at least one of profit sharing, paid time off (i.e., vacation, holiday, sick leave, bereavement, funeral, jury duty, military leave, maternity/paternity leave, voting, etc.), benefit plan premiums or fees, retirement plan contributions, "cash in-lieu-of benefit" payments, and other payments qualifying as fringe benefits per the contract management data provided for a set time period, wherein the set time period comprises at least one of hourly, weekly, bi-weekly, semi-monthly, monthly, quarterly, and annually. As the payroll data is imported into the processing system 103 the data is standardized through the use of AI to recognize data types within the imported data. Alternatively, the data may be standardized during the import through the use of at least one of artificial intelligence (AI), delimited columns, and other methods known in the art. The data may also be imported into the database through direct database connections and bulk insert operations.

The contractual data interface 205 may comprise an interface for obtaining contractual data from an outside source. The outside source may be the employer and/or a third party company. The contractual data may be imported through at least one of a platform plug-in, an application programming interface (API), an electronic data interchange (EDI), file import, and raw data import. The contract management data comprises at least one of solicitation name (including amendment(s) or modification(s)), identifying number, issuance date, contract name (including extension(s), bridge(s), modification(s) or amendments(s)), identifying number, award date, base year, option year(s), period of performance, effective date(s), execution date(s), contract vehicle type (i.e., firm fixed price, time & material, cost reimbursement, cost plus, etc.), location where work is performed, wage determination(s), collective bargaining agreement(s), type of contract labor categories/classifications, base pay rate for position, required fringe benefit or health and welfare rate(s), required vacation hours, required holiday hours, required sick hours, any other type of required paid time off hours, and maximum or minimum hours for compliance. The contract type comprises at least one of a Service Contract Act (SCA) contract or Davis-Bacon Act (DBA) contract or Davis-Bacon Related Acts (DBRA) contract or any other type of state or local prevailing wage contract. As the contractual data is imported into the processing system 103 the data is standardized through the use of AI to recognize data types within the imported data. Alternatively, the data may be standardized during the import through the use of at least one of AI, delimited columns, and other methods known in the art. The data may also be imported into the database through direct database connections and bulk insert operations.

The fringe benefit plan data interface 210 may comprise an interface for obtaining fringe benefit plan data from an outside source. The outside source may be the employer and/or a third party company. The fringe benefit plan data may be imported through at least one of a payroll or benefits enrollment platform plug-in, an application programming interface (API), an electronic data interchange (EDI), file import, and raw data import. The fringe benefit plan information comprises at least one of the fringe benefit plan category(ies), dependent coverage tier(s), current and retroactive premium(s) or fee(s), prior month or quarter payment(s) made, the amount employer is paying towards the fringe benefit plan(s), and the amount of employee deduction(s) made. The fringe benefit plan category includes at least one of medical premium information, dental premium information, vision premium information, long term disability premium information, short term disability premium information, life insurance premium information, accidental insurance premium information, critical illness insurance premium information, hospitalization insurance premium information, cancer insurance premium information, accident death & dismemberment (AD&D) insurance premium information, unemployment insurance premium information, hour bank reserve information, and any other type of fringe benefit plan premium information. As the fringe benefit plan data is imported into the processing system 103 the data is standardized through the use of AI to recognize data types within the imported data. Alternatively, the data may be standardized during the import through the use of at least one of AI, delimited columns, and other methods known in the art. The data may also be imported into the database through direct database connections and bulk insert operations.

The retirement funding data interface 212 may comprise an interface for obtaining and communicating retirement funding data to and from an outside source. The outside source may be a retirement fund management company or other retirement fund management group. The retirement fund data may be imported through at least one of a platform plug-in, an application programming interface (API), an electronic data interchange (EDI), file import, and raw data import. The retirement fund information may comprise employee retirement funds and related details. The data may also be imported into the database through direct database connections and bulk insert operations.

The API interface 215 may comprise an interface used to import data into the processing system 103. The API interface 215 may comprise a set of protocols, tools, and definitions that allow different software applications to communicate and interact with each other. The API interface 215 may work by enabling a requesting system (such as a web application or mobile app) to access the data import of the processing system 103 in a predefined and standardized manner. The requesting system sends a request using HTTP/HTTPS or other communication protocols to the API interface 215, specifying the required action or data. The API interface 215 then processes the request and returns the requested data or performs the required action. Alternatives to the API interface may include direct database connections, file-based data transfers (such as CSV, JSON, or XML files), message queues, remote procedure calls (RPC), and various integration methods like ETL (Extract, Transform, Load) processes or middleware solutions.

The EDI interface 220 may comprise an interface used to import data into the processing system 103. The EDI interface 220 may use a standardized method to electronically exchange structured data between different computer systems, following specific formats and protocols. The EDI interface 220 may work by facilitating the transfer of documents (such as payroll, contractual, fringe, or census data) in a machine-readable format from one trading partner to another. The EDI interface 220 typically involves the use of standard message formats like ANSI X12 or EDIFACT, defining the structure for different types of business documents. The EDI interface 220 may reduce manual entry errors and streamline the exchange process. The EDI interface 220 functions by mapping data fields in one organization's system to the required format of the receiving organization. Alternatives to the EDI interface 220 may include, but are not limited to APIs for data exchange, direct file transfers, web services, and newer technologies such as AS2 (Applicability Statement 2) for secure data transmission over the internet, or newer integration methods that might use a combination of APIs, middleware, and custom data integration solutions for business-to-business communication.

The employee census interface 225 may comprise an interface for obtaining employee census data from an outside source. The outside source may be the employer and/or a third party company. The employee census data comprises at least one of employee name, employee address, employee phone number(s), employee email address(es), employee birthdate, employee social security number, employee employment status information (i.e., full-time, part-time, temporary, seasonal, PRN, etc.), employee Fair Labor Standards Act (FLSA) classification status, employee labor category classification(s), employee pay rate(s) per classification, employee fringe benefit or health & welfare hourly rate(s) per labor classification, employee hire date, employee SCA anniversary or seniority date, employee new hire status, employee furlough status along with start and end dates, Family Medical Leave Act (FMLA) covered leave status along with start and end dates, employee unpaid leave status along with start and end dates, employee separation date, and employee position changes. As the employee census data is imported into the processing system 103 the data is standardized through the use of AI to recognize data types within the imported data. Alternatively, the data may be standardized during the import through the use of at least one of AI, delimited columns, and other methods known in the art. The data may also be imported into the database through direct database connections and bulk insert operations.

The filtering engine 230 may comprise an engine for filtering relevant data for analysis from the other pieces of data imported from the payroll data interface 201, a contractual data interface 205, a fringe benefit data interface 210, an API interface 215, an EDI interface 220, and an employee census interface 225. The filtering engine 230 may use at least one of column headers to filter the data, filter by multiple criteria and pivot tables to filter the standardized data. The filtering engine 230 may receive input from the AI engine 260 on which sets of data are relevant based on local, state, federal laws, and/or user status of being internal or external to the employer. Additionally, The filtering engine 230 may receive input from external programs to determine which sets of data are relevant to improve the operating efficiency of the external programs.

The flagging engine 235 may comprise an engine for flagging data in a database. The flagging engine may make these flags based on input from at least one of the report generation engine 240, analytics engine 265, or user input. In an exemplary embodiment of the invention, the flagging engine 235 may flag data of interest automatically. The flag may include a version tag to indicate when the data was flagged and improve auditing ability of a user to analyze the stored data. The flagging engine may utilize a decision tree when analyzing which flags to apply based on local, state, federal laws, and previously received inputs from a user. This improves over traditional methods which utilize inefficient file versioning as opposed to versioning changes within a single file. The flagging engine 235 may also utilize the decision making from the AI engine 260 to adjust flagging based on in-house or external requirements for at least one of contract compliance and reporting time periods. Alternatively, the flag may be applied to a portion of data indicated by the report generation engine 240, analytics engine 265, or user input.

The report generation engine 240 may comprise an engine for generating alerts and reports from the analyzed data. The report generation engine may receive instructions from at least one of the analytics engine 265 and user input. The report generation engine may produce a report providing an indication of payment overages, shortfalls, and the relationship between at least two of the employer, employee, and benefits provider. The report generation engine 240 may also indicate significant data indicated by the flagging engine 235. The report generation engine may filter out data based upon the needs of an additional program that requires a specific set of data. This step may improve the efficiency of exterior programs working with the processor 103. The reports generated by the report generation engine 240 may be stored on at least one of the user device 110 and database 104. The reports generated may be formulated for a specific user type, which includes, but is not limited to the employee and employer.

The organization engine 245 may comprise a standardization engine for the data imported by at least one of the payroll data interface 201, a contractual data interface 205, a fringe benefit data interface 210, an API interface 215, an EDI interface 220, and an employee census interface 225. The standardization may be executed through the use of AI trained on successfully imported data to determine the data class of the imported data. The organization engine 245 may also comprise an encryption engine for the imported data.

The GUI interface 250 may comprise an image generation and communication interface between the processing system 103 and a monitor or display. The display interface 250 may comprise at least one of a hardware or wireless interface to connect the processing system 103 and a monitor or display. The GUI interface 250 may generate benefits owed data, wherein the benefits owed data is calculated based on the total paid time data and the fringe benefits rate. The GUI interface 250 may generate benefits paid data, wherein the benefits paid data is calculated by totaling all qualifying fringe benefits or health and welfare related benefits paid by the employer. The GUI interface 250 may generate overage data or shortfall-data, wherein the overage data is computed by determining an excess when benefits paid exceeds benefits owed and wherein shortfall data is computed by determining a shortage when benefits owed exceeds benefits paid. The GUI interface 250 may generate an insurance overpay data, wherein the insurance overpay data is calculated based on insurance data and benefits paid data. The GUI interface 250 may provide personalized displays based on a user status, which may include, but is not limited to, a user who is an employee and is an employer.

The database interface 255 may comprise a connection between the processing system 103 and the database 104. This connection may be wired or wireless and allows for the processing system to input, extract, and modify data on the database 104.

The AI engine 260 may comprise a trained AI for analysis of the standardized imported data from the payroll data interface 201, a contractual data interface 205, a fringe benefit data interface 210, retirement funding data interface 212, an API interface 215, an EDI interface 220, and an employee census interface 225. The AI engine may be trained on other imported and verified data from historical payroll, fringe benefit, retirement funding, contractual, and employee census sources. Alternatively, the AI engine may be trained on local, state, and federal laws relating to payroll, fringe benefit, and contractual relationships. The AI may be trained through supervised learning, unsupervised learning, semi-supervised learning, reinforcement learning, transfer learning, online learning, and self-supervised learning. The AI engine 260 may be used to detect absence of necessary information for audit purposes. The AI engine 260 may perform error checking within the imported data based on training. The AI engine 260 may be able to send commands to the flagging engine 235. The AI engine 260 then provides a benefit in finding errors that are typically missed by traditional methods due to the large amount of legal and accounting data processed and accomplishes the checks within a shorter period of time.

The analytics engine 265 may comprise an engine for analyzing data imported from at least one of imported data from the payroll data interface 201, a contractual data interface 205, a fringe benefit data interface 210, a retirement funding interface 212, an API interface 215, an EDI interface 220, and an employee census interface 225. The analytics engine calculates any overages, shortfalls, and tracks payments and benefits owed between at least two of the employer, employee, and benefits provider. The analytics engine may calculate shortfalls in a shortened evaluation period and extrapolate the information to alert a user of the potential shortfall for the evaluation period. The alert may be tailored to a user's company policy as imported through the contractual data. This improves on current methods which can only find shortfalls at the end of a long evaluation period (monthly or quarterly) or completed pay cycle without being able to predict future shortfalls. The shortages and overages may trigger an alert to the flagging engine 235 and the report generation engine 240. Alternatively, the analytics engine 265 may calculate the fringe benefit rate requirement. The fringe benefit rate requirement may comprise at least one of an hourly, weekly, monthly or annual fringe benefit or health and welfare rate requirement determined from wage determination or collective bargaining agreement information associated with the contract management data or extracted from the contract management data. The calculation may detect overpayment to a benefits plan and indicate and assist a user in moving funds that have been indicated as an overage into a separate location, including but not limited to a retirement plan. The analytics engine 265 may make changes to the data found within the database when updates are provided through importing data or user input. When the changes are made to the data, a versioning tag may be applied to a subset of the changed data and not the entirety of the document. These changes may be made based on at least one of input from the AI engine 260 and further informed by the user status of being internal to the employer or external to the employer. This varies from traditional methods which may apply a version to the entirety of the data within the database. This method allows for quicker data auditing when compared to traditional methods by a user by highlighting important information within the database.

The training data interface 270 may comprise an interface to link the processing system 103, AI engine 260, and a corpus of training data. The data may comprise other imported and verified data from historical payroll, fringe benefits, retirement funding, contractual, and employee census sources. Alternatively, the data may comprise local, state, and federal laws relating to payroll, fringe benefits, and contractual relationships.

Figure 3:
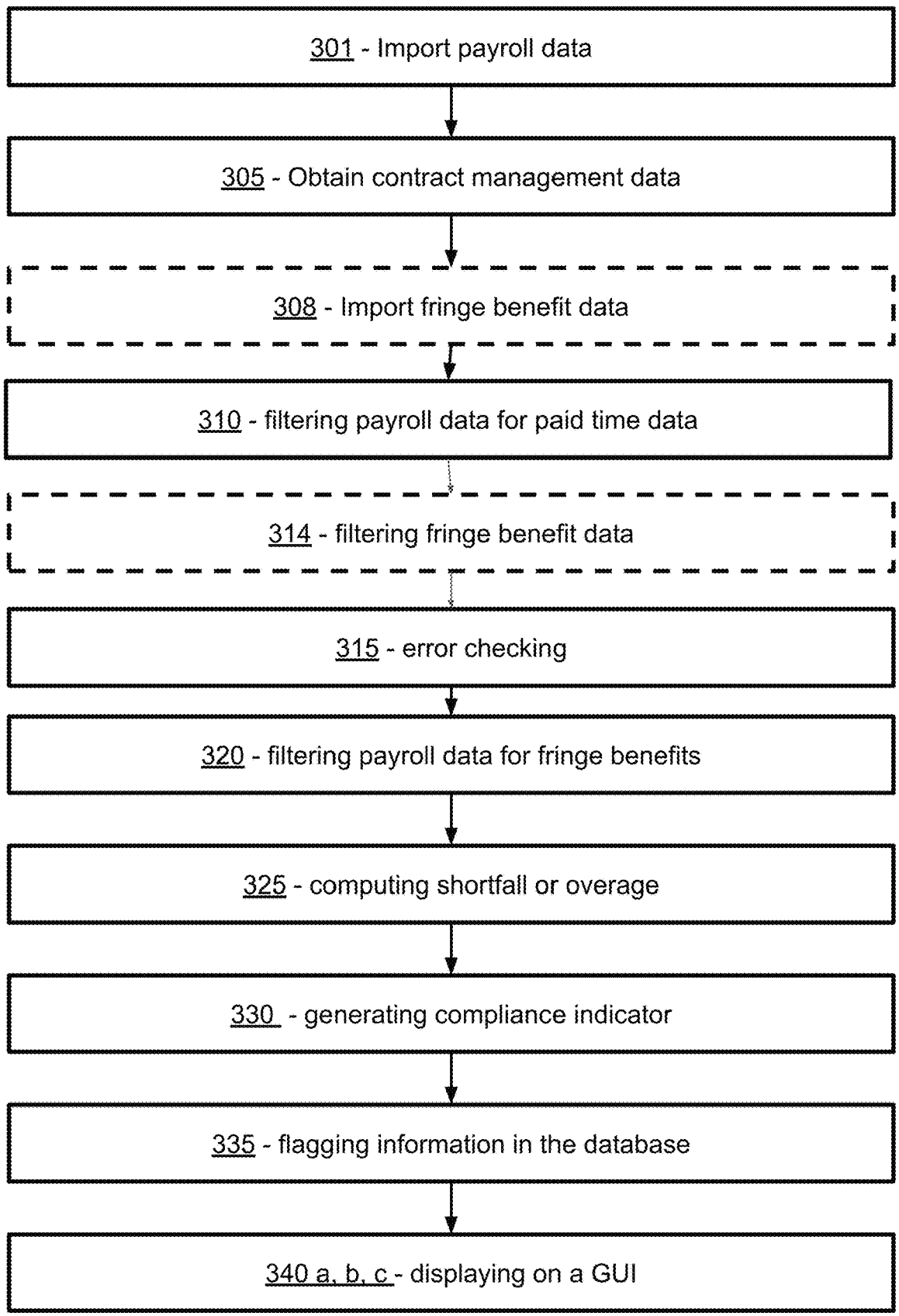
FIG. 3 illustrates a method diagram for an exemplary embodiment of a payroll or fringe benefit management system.

FIG. 3 illustrates an exemplary process for standardizing, analyzing and reporting on contractual relationships between employers and employees. The process may comprise importing payroll data 301, obtaining or importing contract management data 305, importing fringe benefit data 308, filtering payroll data for paid time data 310, filtering fringe benefit data creditable toward the contractual requirement 314, error checking 315, filtering payroll data for fringe benefit data creditable toward the contractual requirement 320, computing a shortfall or overage 325, generating a compliance indicator 330, flagging information in a database 335, and displaying information on a GUI 340 a, b, c.

Importing payroll data 301 may comprise gathering of payroll data from a third party. This payroll data may comprise at least one of regular hours worked, standard or time and a half or double or triple overtime hours worked, second shift hours worked, third shift hours worked, hazard hours worked, paid time off hours (i.e., vacation, holiday, sick leave, bereavement, funeral, jury duty, military training, maternity/paternity leave, voting, etc.), training hours, travel hours, sleep hours, on-call hours, callback hours, federal or state or local tax deductions, FICA deductions, Social Security deductions, medicare deductions, company-sponsored benefit plan deductions, dependent coverages, retirement plan contributions and/or deductions, union dues, apprenticeship costs, pay rates, overtime rates, and differential rates. The paid time data may be comprised of at least one differential pay rate for each paid time category. The employee fringe benefits payment data may comprise at least one of profit sharing, paid time off (i.e., vacation, holiday, sick leave, bereavement, funeral, jury duty, military leave, maternity/paternity leave, voting, etc.), benefit plan premiums or fees, retirement plan contributions, "cash in-lieu-of benefit" payments, and other payments qualifying as fringe benefits per the contract management data provided for a set time period, wherein the set time period comprises at least one of hourly, weekly, bi-weekly, semi-monthly, monthly, quarterly, and annually. The data may then be organized, standardized, and encrypted for easier analysis and processing.

Obtaining contract management data 305 may comprise gathering contract data from a third party. The contract management data may comprise at least one of solicitation name (including amendment(s) or modification(s)), identifying number, issuance date, contract name (including extension(s), bridge(s), modification(s) or amendments(s)), identifying number, award dates, base year, option year(s), period of performance, effective date(s), execution date(s), contract vehicle type (i.e., firm fixed price, time & material, cost reimbursement, cost plus, etc.), location where work is performed, wage determination(s), collective bargaining agreement(s), type of contract labor categories/classifications, base pay rate for position, required fringe benefit or health and welfare rate(s), required vacation hours, required holiday hours, required sick hours, any other type of required paid time off hours, and maximum or minimum hours for compliance. The contract type comprises at least one of a Service Contract Act (SCA) contract or Davis-Bacon Act (DBA) contract or Davis-Bacon Related Acts (DBRA) related acts contract or any other type of state or local prevailing wage contract. The data may then be organized, standardized, and encrypted for easier analysis and processing.

Importing fringe benefit data 308 may comprise gathering benefit data from a third party. The fringe benefit data may comprise at least one of the fringe benefit plan category(ies), dependent coverage tier(s), current and retroactive premium(s) or fee(s), prior month or quarter payment(s) made, the amount employer is paying towards the fringe benefit plan(s), and the amount of employee deduction(s) made. The fringe benefit plan category includes at least one of medical premium information, dental premium information, vision premium information, long term disability premium information, short term disability premium information, life insurance premium information, accidental insurance premium information, critical illness insurance premium information, hospitalization insurance premium information, cancer insurance premium information, accident death & dismemberment (AD&D) insurance premium information, unemployment insurance premium information, hour bank reserve information, any other type of fringe benefit plan premium information, and retirement funding data.

Filtering payroll data for paid time data 310 may comprise highlighting and separating payroll data from the importing steps 301 and 305. Paid time data may include, but is not limited to, hours worked and paid time off. This data is extracted for calculations later in the method. The data is filtered to provide improved speed of calculations by the invention when compared to traditional methods.

Filtering fringe benefit data creditable toward contractual requirement(s) 314 may comprise highlighting and separating fringe benefit data from the importing step 308. The filtered fringe benefit data may be directed towards invoiced payments directed towards fringe benefits. This data is extracted for calculations later in the method. The data is filtered to provide improved speed of calculations by the invention when compared to traditional methods. The step may also optionally include filtering the imported paid time off data creditable toward contractual requirement(s)

Error checking 315 may comprise utilizing an AI to check for common errors and misspelled words within the payroll and benefits data. This error check may also include determining if any data is missing or corrupted during the import process. The error check may be informed by an AI that has been trained on a corpus of training data. The corpus of training may be produced from local, state, federal laws, and previously audited payroll and benefits data.

Filtering payroll data for fringe benefit data creditable toward the contractual requirement 320 may comprise filtering the imported payroll data for only fringe benefit payments. The fringe benefit payments may be comprised of at least one of profit sharing, paid-time off, benefit plan premiums or fees, retirement plan contributions, and other payments qualifying as fringe benefits per the contract management data provided for a set time period, wherein the set time period comprises at least one of hourly, weekly, bi-weekly, semi-monthly, monthly, quarterly, and annually. Filtering and disregarding extraneous data as identified by the invention speeds up calculations when compared to traditional methods.

Computing a shortfall or overage 325 may comprise calculating any overages paid by the employer or employee to an outside vendor. These calculations are performed on the filtered data. In an embodiment of the invention the outside vendor may comprise a benefits provider or insurer but other vendors' who require payments associated with payroll payments may be included as well.

Generating a compliance indicator 330 may comprise analyzing at least one of the results from error checking or the shortfall/overage calculation and comparing to expected results as found in previously analyzed payroll and/or benefits data. By continuously improving the models with data analyzed from previous data sets, the overall speed and reliability of the compliance indicator is improved.

Flagging information in a database 335 may comprise providing a flag to data indicated by the compliance indicator. The flag may include a versioning tag to as portion of the data to improve ease of data storage and access to the information in the database. Flagging information in a database 335 may comprise providing an alert to a user as well.

Displaying information on a GUI 340 *a, b, c* may comprise displaying the benefits owed data 340*a*, displaying the benefits paid data 340*b*, and displaying the overage or shortfall data 340*c*. The benefits owed data is calculated based on the total paid or worked time data and the fringe benefits rate. The benefits paid data is calculated by totaling all qualifying fringe benefits or health and welfare related benefits paid by the employer. The overage data is computed by determining an excess when benefits paid exceeds benefits owed and wherein shortfall data is computed by determining a shortage when benefits owed exceeds benefits paid.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above mentioned systems, units, modules, engines, controllers, interfaces, components or the like may be and/or comprise hardware and/or software as described herein. For example, the enterprise system 101, the query wise stateless structure engine 110, the large language model (LLM) system 120, the network 150, and subcomponents thereof may be and/or comprise computing hardware and/or software as described herein in association with FIGS. 4-7. Furthermore, any of the above mentioned systems, units, modules, engines, controllers, interfaces, components or the like may use and/or comprise an application programming interface (API) for communicating with other systems units, modules, engines, controllers, interfaces, components, or the like for obtaining and/or providing data or information.

Figure 4:
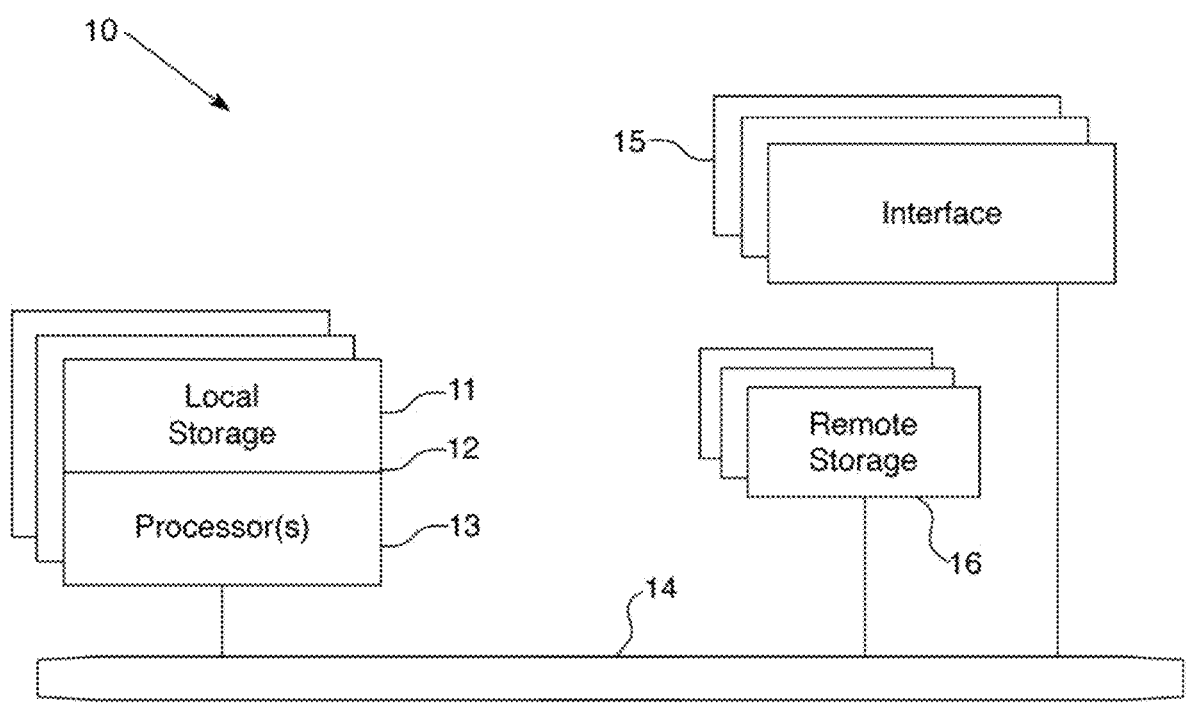
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
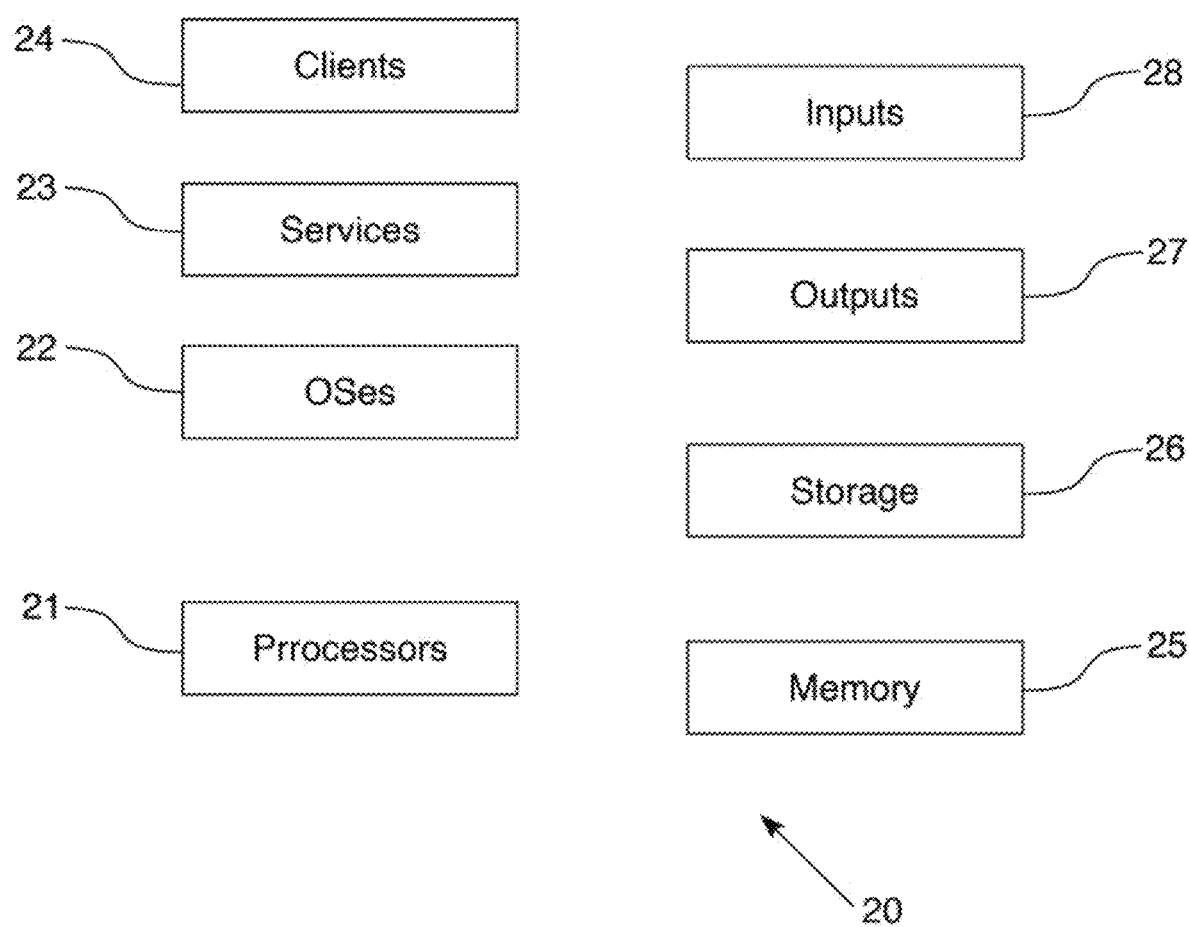
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
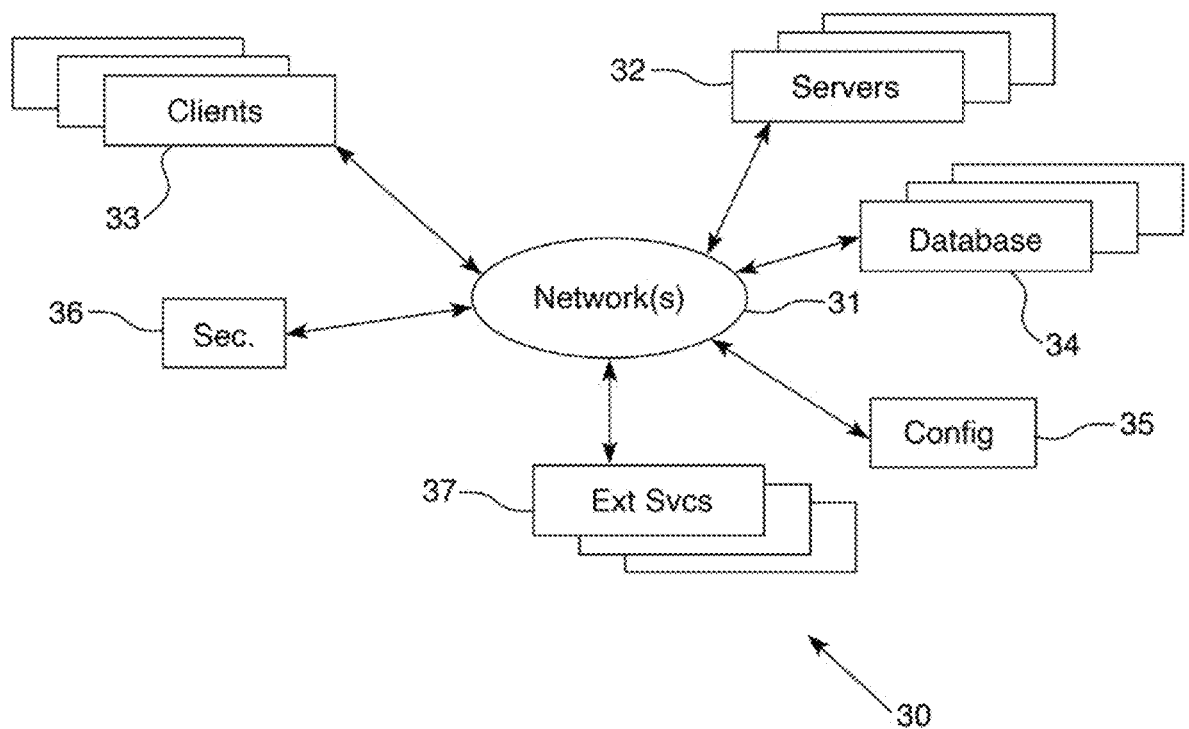
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
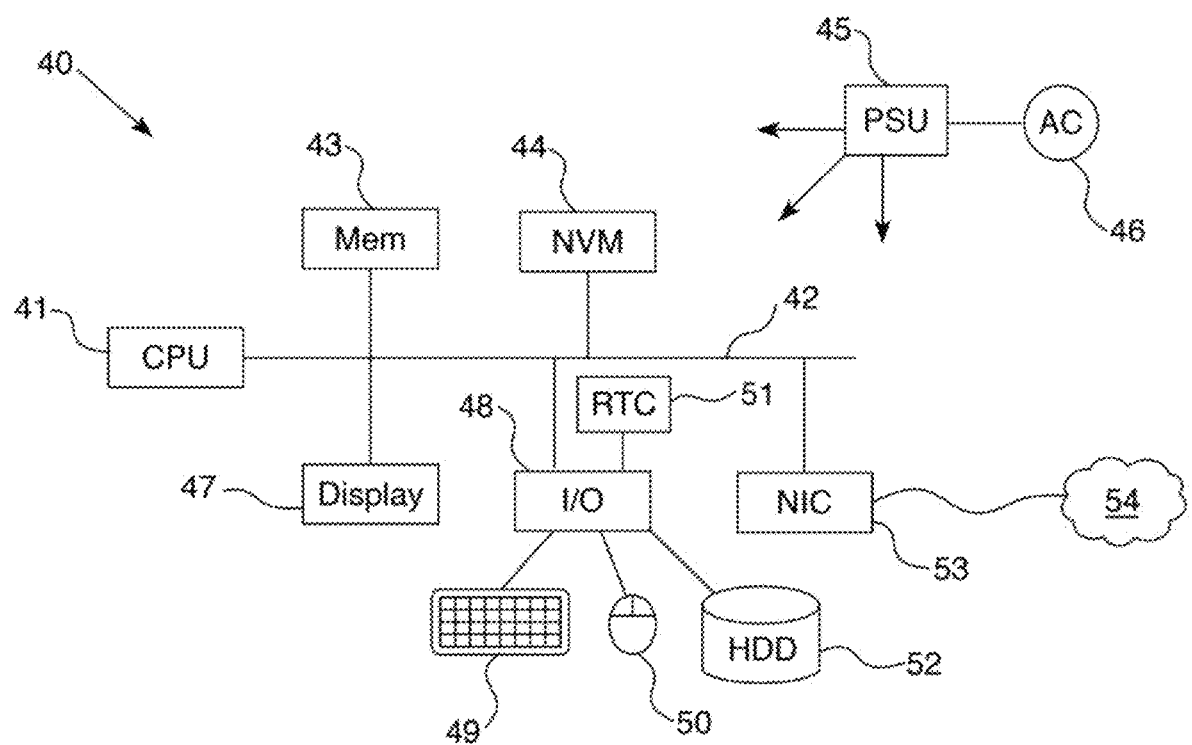
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for standardizing, analyzing, and reporting on employer/employee contractual relationships, the computer implemented method comprising:

importing unstructured payroll data, wherein the payroll data is imported via at least one of a payroll platform plug-in, an application programming interface (API), electronic data interchange (EDI), file import, and raw data import wherein importing the data comprises standardizing the payroll data, by converting the data to a standardized format by automatically mapping the data to corresponding fields in a database;

obtaining contract management data wherein the contract management data is obtained via at least one of data import, data extraction, an application programming interface (API), electronic data interchange (EDI), and data entry, the contract management data comprising information associated with at least one of a government and union contract, the contract management data comprising at least one of wage determination and/or collective bargaining agreement, contract type, labor classification, wage rate, and fringe benefit rate requirement;

filtering the payroll data to identify paid time data, wherein the paid time data comprises at least one of hours worked and paid time off;

identifying a first and second error in the payroll and/or contract management data in real time by applying predictive analytics to at least a portion of data within the payroll and/or contract management data, the predictive analytics trained on a corpus of training data, wherein the corpus of training data comprises at least one of local, state, and federal law provisions and previously analyzed payroll and contract data sets wherein the predictive analytics employs machine learning models including decision trees and/or neural networks to identify patterns and anomalies in the data, and wherein the machine learning model is continuously updated and refined based on new corpus of training data to improve accuracy and adaptability to changing regulations;

flagging an error from the first and second identified errors wherein flagging the error further comprises applying a compliance decision tree based on compliance training data, wherein the compliance training data comprises local, state, and/or federal laws, and previous input from a user to flag the more significant error of the first and second identified errors, wherein the more significant error encompasses the greatest number of compliance issues;

training the compliance decision tree by updating the compliance training data by obtaining a compliance legal dataset, wherein the compliance legal dataset is obtained in real time from available local, state, and/or federal laws;

automatically providing, in real time, an alert associated with the error flagged;

filtering the payroll data to identify employee fringe benefits payment data wherein the employee fringe benefits payment data comprises, for each employee, total fringe benefits paid by the employer to the employee for a given period of time;

computing, for each employee associated with a given employer, an overage or shortfall;

generating, for each employee, a compliance indicator, the compliance indicator indicating at least one of the minimum requirements has been met or not been met;

flagging in a database the determined overage or shortfall and flagging the data associated with the determined overage or shortfall, wherein flagging comprises an indication that a compliance criteria has not been met;

applying a version tag to the overage or shortfall wherein the version tag indicates a time the overage or shortfall was flagged, the tag applied to the portion of overage or shortfall flagged data;

displaying, in a first graphical user interface element, benefits owed data, wherein the benefits owed data is calculated based on the total paid time data and the fringe benefits rate;

displaying, in a second graphical user interface element, benefits paid data, wherein the benefits paid data is calculated by totaling all qualifying fringe benefit and health and welfare related benefits paid by the employer; and displaying, in a third graphical user interface element, overage data or shortfall data, wherein the overage data is computed by determining an excess when benefits paid exceeds benefits owed and wherein shortfall data is computed by determining a shortage when benefits owed exceeds benefits paid.

2. The computer implemented method according to claim 1, wherein the payroll data comprises at least one of regular hours worked, standard or time and a half or double or triple overtime hours worked, second shift hours worked, third shift hours worked, hazard hours worked, paid time off hours (i.e., vacation, holiday, sick leave, bereavement, funeral, jury duty, military training, maternity/paternity leave, voting, etc.), training hours, travel hours, sleep hours, on-call hours, callback hours, federal or state or local tax deductions, FICA deductions, Social Security deductions, medicare deductions, company-sponsored benefit plan deductions, dependent coverages, retirement plan contributions and/or deductions, union dues, apprenticeship costs, pay rates, overtime rates, and differential rates.

3. The computer implemented method according to claim 1, wherein the contract management data comprises at least one of solicitation name (including amendment(s) or modification(s)), identifying number, issuance date, contract name (including extension(s), bridge(s), modification(s) or amendments(s)), identifying number, award dates, base year, option year(s), period of performance, effective date(s), execution date(s), contract vehicle type (i.e., firm fixed price, time & material, cost reimbursement, cost plus, etc.), location where work is performed, wage determination(s), collective bargaining agreement(s), type of contract labor categories/classifications, base pay rate for position, required hourly, weekly, monthly, annual fringe benefit or health and welfare rate(s), required vacation hours, required holiday hours, required sick hours, any other type of required paid time off hours, and maximum or minimum hours for compliance.

4. The computer implemented method according to claim 3, wherein contract type comprises at least one of Service Contract Act (SCA) contract or Davis-Bacon Act (DBA) contract or Davis-Bacon Related Acts (DBRA) related acts contract or any other type of state or local prevailing wage contract.

5. The computer implemented method according to claim 1, further comprising importing fringe benefit plan information wherein the fringe benefit plan information is imported via at least one of fringe benefit plan platform plug-in, an application programming interface (API), electronic data interchange (EDI), file import, and data import, the fringe benefit plan information comprising total costs associated with fringe benefit plan.

6. The computer implemented method according to claim 5, wherein the fringe benefit plan information comprises at least one of the fringe benefit plan category(ies), dependent coverage tier(s), current and retroactive premium(s) or fee(s), prior month or quarter payment(s) made, the amount employer is paying towards the fringe benefit plan(s), and the amount of employee deduction(s) made, wherein the fringe benefit plan category(ies) comprises at least one of medical premium information, dental premium information, vision premium information, long term disability premium information, short term disability premium information, life insurance premium information, accidental insurance premium information, critical illness insurance premium information, hospitalization insurance premium information, cancer insurance premium information, accident death & dismemberment (AD&D) insurance premium information, unemployment insurance premium information, hour bank reserve information, any other type of fringe benefit plan premium information, and retirement funding data.

7. The computer implemented method according to claim 6, further comprising displaying in a fourth graphical user interface, an overage amount alert to a user, wherein the overage amount alert is based on comparing fringe benefit plan information and the payroll data.

8. The computer implemented method according to claim 1, wherein the compliance indicator provides when the minimum has not been met a further indication of the shortage.

9. The computer implemented method according to claim 1, wherein the compliance indicator provides when the minimum has been met, a further indication of how any overage has been allocated.

10. The computer implemented method according to claim 1, wherein the compliance indicator is generated based on the contract management data.

11. The computer implemented method according to claim 1, further comprising obtaining fringe benefit plans invoiced data wherein the fringe benefits invoiced data comprises the amount that a benefit plan charged to the employer.

12. The computer implemented method according to claim 11, further comprising generating a benefit plan overpay alert by comparing the plan benefits invoiced data and the payroll data to see if a benefits pay overage is present; and
   providing an benefits overpay alert user interface to a user the benefits overpay alert user interface comprising a benefits overpay alert and a savings vehicle for redirecting the benefits pay overage.

13. The computer implemented method according to claim 1, further comprising obtaining employee census data, wherein employee census data comprises at least one of employee name, employee address, employee phone number(s), employee email address(es), employee birthdate, employee social security number, employee employment status information (i.e., full-time, part-time, temporary, seasonal, PRN, etc.), employee Fair Labor Standards Act (FLSA) classification status, employee labor category classification(s), employee pay rate(s) per classification, employee fringe benefit or health & welfare hourly rate(s) per labor classification, employee hire date, employee SCA anniversary/seniority date, employee new hire status, employee furlough status along with start and end dates, Family Medical Leave Act (FMLA) covered leave along with start and end dates, employee unpaid leave status along with start and end dates, employee separation date, and employee position changes.

14. The computer implemented method according to claim 1, wherein the total benefits paid by the employer is subdivided by at least one of per employee basis and an averaging basis as determined by the associated contractual management data.

15. The computer implemented method according to claim 1, wherein payroll data comprises data associated with at least one pay period wherein the pay period may comprise at least one of a pay period identifier and timestamp; wherein the payroll data is associated with an employer.

16. The computer implemented method according to claim 1, wherein fringe benefit rate requirement comprises at least one of a fringe benefit and health and welfare rate requirement determined from wage determination and/or collective bargaining agreement information associated with the contract management data or extracted from the contract management data.

17. The computer implemented method according to claim 1, wherein hours worked comprises at least one of regular hours worked, overtime hours worked, training hours worked, travel hours worked.

18. The computer implemented method according to claim 1, wherein paid time off comprises at least one of vacation, holiday, sick, bereavement, funeral, jury duty, military training, maternity/paternity leave, voting.

19. The computer implemented method according to claim 1, wherein the paid time data is comprised of at least one differential pay rate for each paid time category; wherein the fringe benefit plan category of benefits includes at least one of medical, dental, vision, life, accidental death and dismemberment, long and short term disability, accident, cancer, critical illness, hospitalization, hour bank reserve.

20. The computer implemented method according to claim 1, wherein the employee fringe benefits data further comprises at least one fringe benefit plan category of benefits paid by the employer for the pay period.

21. A computing system for standardizing, analyzing, and reporting on employer/employee contractual relationships, the computing system comprising:
   at least one computing processor; and
   memory comprising instructions that, when executed by the at least one computing processor, enable the computing system to:
   importing unstructured payroll data, wherein the payroll data is imported via at least one of a payroll platform plug-in, an application programming interface (API), electronic data interchange (EDI), file import, and raw data import wherein importing the data comprises standardizing the payroll data, by converting the data to a standardized format by automatically mapping the data to corresponding fields in a database;
   obtaining contract management data wherein the contract management data is obtained via at least one of data import, data extraction, an application programming interface (API), electronic data interchange (EDI), and data entry, the contract management data comprising information associated with at least one of a government and union contract, the contract management data comprising at least one of wage determination and/or collective bargaining agreement, contract type, labor classification, wage rate, and fringe benefit rate requirement;
   filtering the payroll data to identify paid time data, wherein the paid time data comprises at least one of hours worked and paid time off;
   identifying a first and second error in the payroll and/or contract management data in real time by applying predictive analytics to at least a portion of data within the payroll and/or contract management data, the predictive analytics trained on a corpus of training data, wherein the corpus of training data comprises at least one of local, state, and federal law provisions and previously analyzed payroll and contract data sets wherein the predictive analytics employs machine learning models including decision trees and/or neural networks to identify patterns and anomalies in the data, and wherein the machine learning model is continuously updated and refined based on new corpus of training data to improve accuracy and adaptability to changing regulations;
   flagging an error from the first and second identified errors wherein flagging the error further comprises applying a compliance decision tree based on compliance training data, wherein the compliance training data comprises local, state, and/or federal laws, and previous input from a user to flag the more significant error of the first and second identified errors, wherein the more significant error encompasses the greatest number of compliance issues;

training the compliance decision tree by updating the compliance training data by obtaining a legal dataset, wherein the legal dataset is obtained in real time from available local, state, and/or federal laws;

automatically providing, in real time, an alert associated with the error flagged;

filtering the payroll data to identify employee fringe benefits payment data wherein the employee fringe benefits payment data comprises, for each employee, total fringe benefits paid by the employer to the employee for a given period of time;

computing, for each employee associated with a given employer, an overage or shortfall;

generating, for each employee, a compliance indicator, the compliance indicator indicating at least one of the minimum requirements has been met or not been met;

flagging in a database the determined overage or shortfall and flagging the data associated with the determined overage or shortfall, wherein flagging comprises an indication that a compliance criteria has not been met;

applying a version tag to the overage or shortfall wherein the version tag indicates a time the overage or shortfall was flagged, the tag applied to the portion of overage or shortfall flagged data;

displaying, in a first graphical user interface element, benefits owed data, wherein the benefits owed data is calculated based on the total paid time data and the fringe benefits rate;

displaying, in a second graphical user interface element, benefits paid data, wherein the benefits paid data is calculated by totaling all qualifying fringe benefit and health and welfare related benefits paid by the employer; and displaying, in a third graphical user interface element, overage data or shortfall data, wherein the overage data is computed by determining an excess when benefits paid exceeds benefits owed and wherein shortfall data is computed by determining a shortage when benefits owed exceeds benefits paid.

22. A computer readable medium comprising instructions that when executed by a processor enable the processor to:

at least one computing processor; and memory comprising instructions that, when executed by the at least one computing processor, enable the computing system to:

importing unstructured payroll data, wherein the payroll data is imported via at least one of a payroll platform plug-in, an application programming interface (API), electronic data interchange (EDI), file import, and raw data import wherein importing the data comprises standardizing the payroll data, by converting the data to a standardized format by automatically mapping the data to corresponding fields in a database;

obtaining contract management data wherein the contract management data is obtained via at least one of data import, data extraction, an application programming interface (API), electronic data interchange (EDI), and data entry, the contract management data comprising information associated with at least one of a government and union contract, the contract management data comprising at least one of wage determination and/or collective bargaining agreement, contract type, labor classification, wage rate, and fringe benefit rate requirement;

filtering the payroll data to identify paid time data, wherein the paid time data comprises at least one of hours worked and paid time off;

identifying a first and second error in the payroll and/or contract management data in real time by applying predictive analytics to at least a portion of data within the payroll and/or contract management data, the predictive analytics trained on a corpus of training data, wherein the corpus of training data comprises at least one of local, state, and federal law provisions and previously analyzed payroll and contract data sets wherein the predictive analytics employs machine learning models including decision trees and/or neural networks to identify patterns and anomalies in the data, and wherein the machine learning model is continuously updated and refined based on new corpus of training data to improve accuracy and adaptability to changing regulations;

flagging an error from the first and second identified errors wherein flagging the error further comprises applying a compliance decision tree based on compliance training data, wherein the compliance training data comprises local, state, and/or federal laws, and previous input from a user to flag the more significant error of the first and second identified errors, wherein the more significant error encompasses the greatest number of compliance issues;

training the compliance decision tree by updating the compliance training data by obtaining a legal dataset, wherein the legal dataset is obtained in real time from available local, state, and/or federal laws;

automatically providing, in real time, an alert associated with the error flagged;

filtering the payroll data to identify employee fringe benefits payment data wherein the employee fringe benefits payment data comprises, for each employee, total fringe benefits paid by the employer to the employee for a given period of time;

computing, for each employee associated with a given employer, an overage or shortfall;

generating, for each employee, a compliance indicator, the compliance indicator indicating at least one of the minimum requirements has been met or not been met;

flagging in a database the determined overage or shortfall and flagging the data associated with the determined overage or shortfall, wherein flagging comprises an indication that a compliance criteria has not been met;

applying a version tag to the overage or shortfall wherein the version tag indicates a time the overage or shortfall was flagged, the tag applied to the portion of overage or shortfall flagged data;

displaying, in a first graphical user interface element, benefits owed data, wherein the benefits owed data is calculated based on the total paid time data and the fringe benefits rate;

displaying, in a second graphical user interface element, benefits paid data, wherein the benefits paid data is calculated by totaling all qualifying fringe benefit and health and welfare related benefits paid by the employer; and displaying, in a third graphical user interface element, overage data or shortfall data, wherein the overage data is computed by determining an excess when benefits paid exceeds benefits owed and wherein shortfall data is computed by determining a shortage when benefits owed exceeds benefits paid.

\* \* \* \* \*